United States Patent
Lin

(10) Patent No.: US 6,223,296 B1
(45) Date of Patent: Apr. 24, 2001

(54) AUTOMATIC SWITCHING DEVICE FOR THE POWER SOURCE INPUT RANGE OF A MONITOR USED IN A PERSONAL COMPUTER

(75) Inventor: Yi-Jen Lin, Taipei (TW)

(73) Assignee: Tatung Co., Ltd., Taipei (TW)

( * ) Notice: Subject to any disclaimer, the term of this patent is extended or adjusted under 35 U.S.C. 154(b) by 0 days.

(21) Appl. No.: 09/204,565

(22) Filed: Dec. 4, 1998

(30) Foreign Application Priority Data

Jan. 14, 1998 (TW) .................................................. 87200624

(51) Int. Cl.[7] .................................................... G06F 1/32
(52) U.S. Cl. ................................ 713/320; 363/37; 307/43
(58) Field of Search ..................................... 713/300, 320; 307/66, 43; 363/37, 49, 59, 60, 61

(56) References Cited

U.S. PATENT DOCUMENTS

| 4,590,546 | * | 5/1986 | Maile | 363/37 |
| 5,347,164 | * | 9/1994 | Yeh | 307/66 |
| 5,640,317 | * | 6/1997 | Lei | 363/49 |
| 5,661,348 | * | 8/1997 | Brown | 307/43 |

* cited by examiner

Primary Examiner—Glenn A. Auve
(74) Attorney, Agent, or Firm—Bacon & Thomas, PLLC

(57) ABSTRACT

An automatic switching device for the power source input range of a personal computer monitor is installed within the switchmode power source circuit of the monitor and includes a comparator and a relay arranged so that, irrespective of whether the power source is at a 110V or 220V voltage level, the rectifying circuit of the switchmode power source circuit is automatically switched to a voltage doubler circuit or a bridge rectifier circuit as appropriate for reducing power losses and saving energy.

2 Claims, 8 Drawing Sheets

| Power Supply Current<br>Start-Up<br>($V_{CC}$ =6.5V for UCX843A, 14V for UCX842A)<br>Operating (Note 2) | $I_{CC}$ | — | 0.5 | 1.0 | — | 0.5 | 1.0 | mA |
|---|---|---|---|---|---|---|---|---|
| | | — | 12 | 17 | — | 12 | 17 | |

AUTOMATIC SWITCHING DEVICE FOR THE POWER SOURCE INPUT RANGE OF A MONITOR USED IN A PERSONAL COMPUTER

BACKGROUND OF THE INVENTION

The present invention relates to an automatic switching device for the power supply input range of a monitor connected with a personal computer, and especially to an automatic range switching device of a low loss rapidly restoring power supply commonly used in voltages of 110V and 220V.

According to the statistics, nowadays at least 250,000,000 monitors of personal computers are used. Assume the average power consumption of each monitor is 50V, the total power consumption will be a very great number. Thus many consumer organizations and energy management institutions have called for reducing the power consumption.

In order to be conveniently manufactured and sold, and to prevent the consumer from making a mistake while using, the specifications of the globally used monitors are called "Auto Range": AC110V±20% and AC220V±20%, or Full Range: AC86V~264V. This wide range of power supply design can't meet the purpose of using the least power of the monitors. The following table lists the power circuits of commercial monitors:

TABLE 1

| Brand | Size | MAX. horizontal frequency | MAX. Power consumption | Input range of power supply |
|---|---|---|---|---|
| OPTIQUEST V775 | 17" | 69 KHz | 80 W | AUTO |
| TATUNG 17N | 17" | 94 KHz | 105 W | AUTO |
| APPLE M2943 | 15" | 48 KHz | 70 W | FULL |
| TATUNG 15VHR | 15" | 64 KHz | 75 W | FULL |

NOTE 1: The circuit control of automatic range is shown in FIG. 1a. If the input voltage of the power supply is 110V, the Triac $I_{801}$ turns on to make the circuit become a voltage doubler. If the power source is 220V the Triac $I_{180}$ cut off, the circuit become bridge rectifier.

NOTE 2: The full range circuit control is shown in FIG. 1b. No matter whether the input voltage of power source is 100V or 220V, the circuit functions as the bridge rectifier.

In the auto range controlling, when the input power source is 110V(i.e. 110V±20%), the rectifying circuit does the function of a voltage doubler, so that the output voltage is the same as that from a 220V power source (i.e. 220V±20%). Now referring to FIG. 1a, the voltage value of Vc is in the range of $\sqrt{2} \times 220V \times (1\pm20\%) = 249V\sim373V$. This value is different from that in the full range, in which VC=124V~373V. When the input voltage of the power source is 100V, the current consumption in the full range is approximately twice that in the auto range. For, example, in the OPTIQUEST V775 with power consumption of 80 W, the former has a current of 1.06 A, while the latter has a current of 0.53 A. However, when the input voltage of the power source is 220V, both have a power consumption of 0.53 A. As shown in Table 2, assuming that the power consumption is 80 W for the two circuits, the specifications of the related components are listed as follows

TABLE 2

| | Specification | | |
|---|---|---|---|
| control circuits | Auto range (A) | Full range (B) | Description |
| Power transistor | Q805 = 4A/500 V | Q805 = 8A/500 V | When input is 110 V, the current of B circuit is twice of that of A Circuit. |
| Filtering capacitor | C809 = 150μ/200 V C810 = 150μ/200 V | C808 = 300μ/400 V | Since Cv = it , when 110 V power input, the voltage of B circuit will be halved, while when i is doubled, then the voltage of C is four times of that of A circuit. |
| output end rectifier | D811 = 100 V 1A D812 = 200 V 1A | D811 = 200 V 1A D812 = 400 V 1A | The number of windings in the primary terminals of A/B circuits are 116 and 231, respectively, while in the secondary terminal, A/B circuits has the same winding numbers. That is in the primary terminal, the ratio of winding number A/B is 0.5. When input is 220 V, the reverse voltage of B circuit is twice of that of A circuit. |
| Voltage multiplier and switch | 1802 = 10A/500 V (STR81145A) | unnecessary | When input is 110 V, the A circuit need a voltage multiplier and switch. |

In table II, for the sizes of the parts used in the A and B circuits, the larger the size, the more expensive the cost. Thus the cost is the primary concern in selecting a circuit. After analyzing, it is known that the power consumption is smaller than 80 W, the circuit has an economic cost by using the full range control, and vice versa.

But from the viewpoint of energy saving, no matter whether the control circuit is operated in full range or in auto range, the prior circuit structures are not preferable. Following are the explanations:

For the circuit operating in auto range: referring to FIG. 2a, a voltage multiplying and switch device($I_{801}$), such as integrated circuit STR80145A. is used. Since a triple directional silicon control rectifier (Triac) is built therein and a voltage decreasing resistor is connected, some loss will occur, as shown in FIG. 2b.

For the circuit operating in full range: in the highest efficiency, the voltage is in a middle range between 88V~264V; this range is between the range of the 132V~176V. When the voltage of power supply is closer to an upper limit or a lower limit, the power consumption is larger and the efficiency will become worse.

Table 3 may prove the above description. For example, for a monitor operated in auto range (17 inches monitor), when the power supply is AC110V, the average power consumption is larger than that in of a power supply of AC220V with a value of $$\frac{66.6+67.1+97.6+94.7}{4}W - \frac{64.5+66.3+91.4+92.2}{4}W = 2.9\ W$$

Also, for a for monitor operated in full range (15 inches monitor) with a lower limit of 88V and an upper limit of 264V, then the average power consumption is larger than that operated in the range of AC132V~AC176V with a value of $$\frac{61.5+63.0+59.2+59.7}{4}W - \frac{59.8+60.0+57.6+57.7}{4}W = 2.1\ W$$

TABLE 3

Pattern cross hatch;  Timing: $F_H$ = 31.5 KHz;  $F_V$ = 70 Hz

| Brand | Specification | | | Input power supply voltage | | | |
|---|---|---|---|---|---|---|---|
| | Size (inch) | Max. horizontal freq. | Rectifier | AC110 V | | AC220 V | |
| | | | | Lower limit 88 V | Upper limit 132 V | Lower limit 176 V | Upper limit 264 V |
| OPTIQUEST V775 | 17" | 69 KHz | Auto range | 1.097 A 66.6 W | 0.769 A 67.1 W | 0.554 A 64.5 W | 0.369 A 66.3 W |
| TATUNG 17N | 17" | 94 KHz | Auto range | 1.503 A 97.6 W | 1.028 A 94.7 W | 0.746 A 91.4 W | 0.499 A 92.2 W |
| APPLE M2943 | 15" | 48 KHz | Full range | 1.025 A 61.5 W | 0.699 A 59.8 W | 0.517 A 60.0 W | 0.353 A 63.0 W |
| TATUNG 15VHR | 15" | 64 KHz | Full range | 0.956 A 59.2 W | 0.657 A 57.6 W | 0.488 A 57.7 W | 0.335 A 59.7 W |

SUMMARY OF THE INVENTION

The object of the present invention is to provide a low loss and power saving automatic switching device for the input range of the power source of a monitor.

For a monitor, the power consumption of 2~3 W almost may be neglected. However, through calculating, it has been discovered that this power is 17% of the power consumption of a monitor. Then, if the power consumption all over the world are added together, it will be appreciated that the total amount is a very large number. Thus, through a long period of research, the inventor of the present invention has derived the following results:

1. The input of a power source is operated in auto range so that the working point of the transformer is within the range of $\sqrt{2}\times220V(1\pm20\%)$ for increasing the working efficiency.
2. The Triac within the voltage multiplying, rectifying and switching device are changed to be controlled by the contacts of a relay for dissipating the heat consumption $V_F \times I_F$ ($V_F$ is the forward voltage of the Triac in the integrated circuit; $I_F$ is the forward current of the Triac in the integrated circuit) induced from voltage multiplying and rectifying.
3. The working current of the voltage multiplying and rectifying device is changed so that it is supplied from the secondary terminal of the transformer for decreasing the power consumption generated from the voltage decreasing circuit.

The TATUNG 17N shown in Table 1 is used as an example, in which the TATUNG 17N has been improved by the above three results. The power consumption is listed in Table 4:

TABLE 4

| Input | Horizontal | Power | | | |
|---|---|---|---|---|---|
| | | 110 V level | | 220 V level | |
| Comparing | frequency | 88 V | 132 V | 176 V | 264 V |
| Before change | 31 KHz | 97.6W | 94.7W | 91.4W | 92.2W |
| | 94 KHz | 105.5W | 101.2W | 97.7W | 99.2W |
| After change | 31 KHz | 92.7W | 91.0W | 89.0W | 88.9W |
| | 94 KHz | 101.2W | 98.0W | 95.2W | 96.1W |

TABLE 4-continued

| Input | Horizontal | Power | | | |
|---|---|---|---|---|---|
| | | 110 V level | | 220 V level | |
| Comparing | frequency | 88 V | 132 V | 176 V | 264 V |
| | | Power consumption before and after changing | | | |
| Result (power saved) | 31 KHz | 4.9W | 3.7W | 2.4W | 3.3W |
| | 94 KHz | 4.3W | 3.2W | 2.5W | 3.1W |

DETAILED DESCRIPTION OF THE PREFERRED EMBODIMENTS

Figure 3:
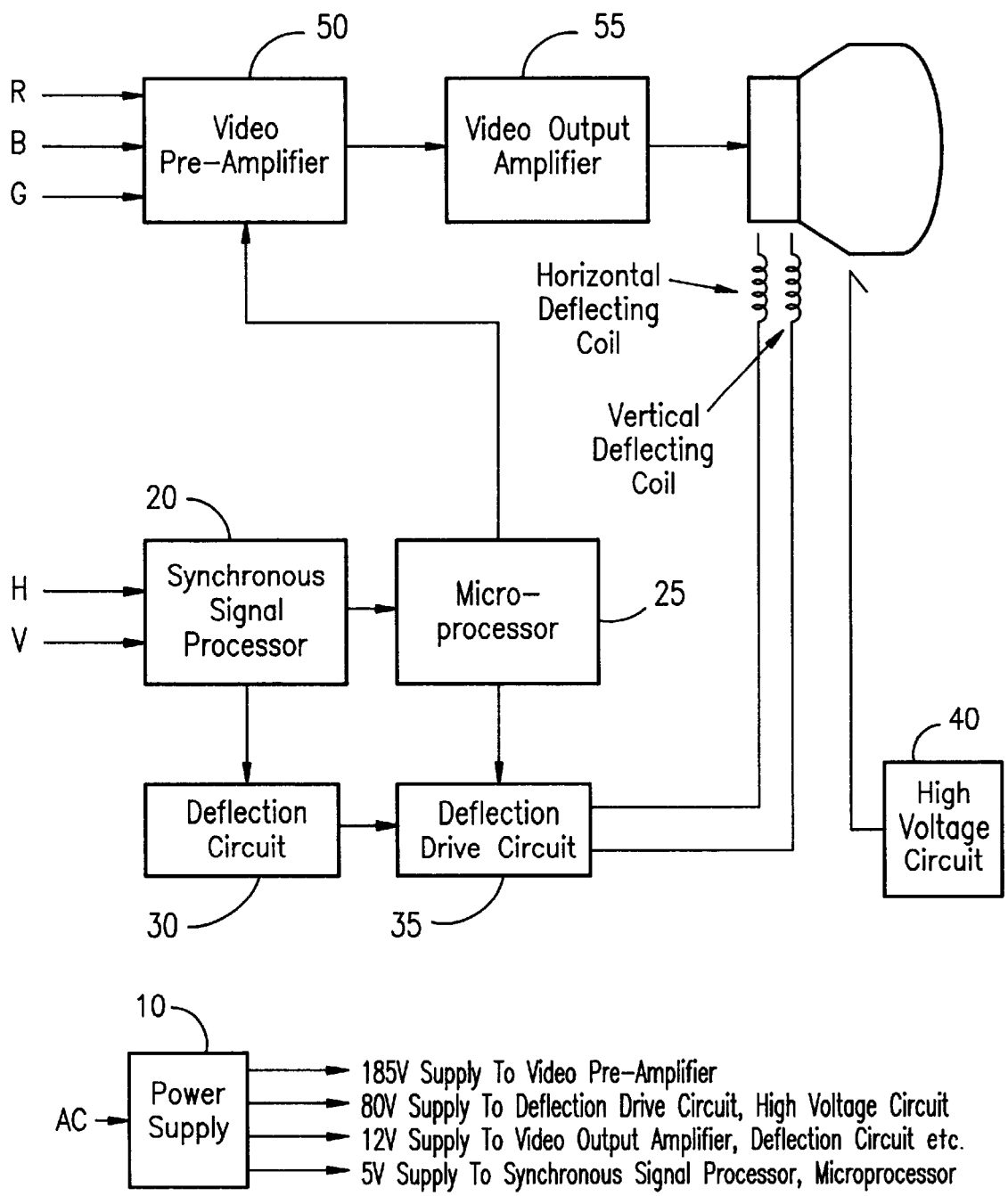
FIG. 3 shows the block diagram of a monitor.

Referring to FIG. 3, the monitor of the present invention comprises a power supply 10, a synchronous signal processor 20, a microprocessor 25, a deflection circuit 30, a deflection drive circuit 35, a high voltage circuit 40, a video pre-amplifier 50 and a video output amplifier 55. The primary advantage of the present invention is to control the action of a power supply 10. In the embodiment of the present invention, the power supply 10 is a switchmode power supply 10. The operation theory of the synchronous signal processor 20, the microprocessor 25, the deflection circuit 30, the deflection drive circuit 35, the high voltage circuit 40, the video pre-amplifier 50 and the video output amplifier 55 are well known by those skilled in the art, and thus not be described herein.

Figure 5A:
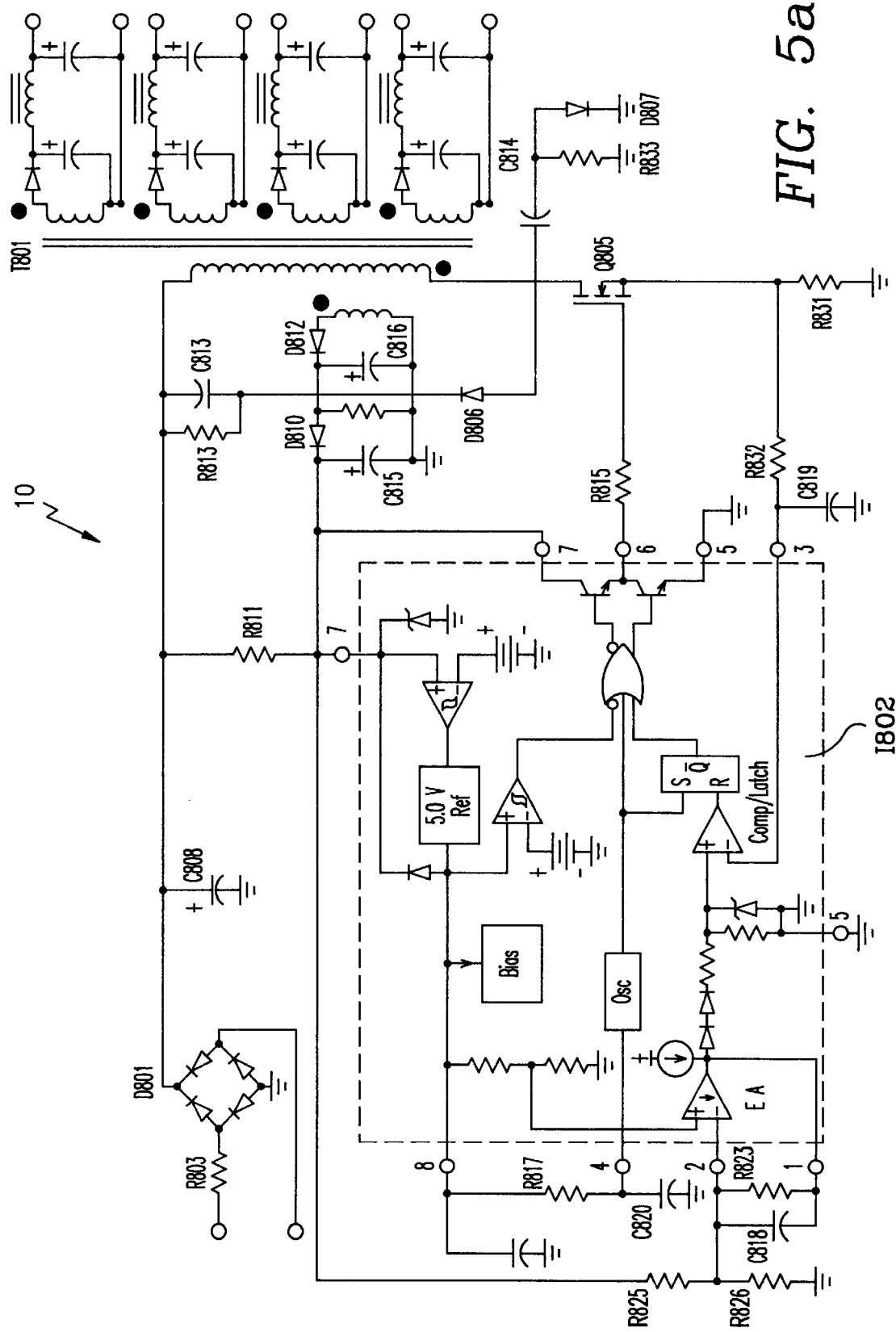
FIG. 5a shows a circuit diagram of the full range control of a switchmode power supply.

The operation of the power supply 10 of the present invention will be described in the following:

(1) The integrated circuit $I_{802}$ is UC3842A, used by the switchmode power supply 10 of the present embodiment, and the applied embodiment thereof is shown in FIG. 5a. The integrated circuit $I_{802}$ is a high performance current mode controller.

(2) Rectifying Circuit: The alternating current (A.C.) power supply is connected to the rectifier $D_{801}$ through the resistor $R_{803}$ for rectifying, then through a capacitor $C_{809}$, the circuit being further divided into a start-up circuit and a driving circuit.

Figure 4A:
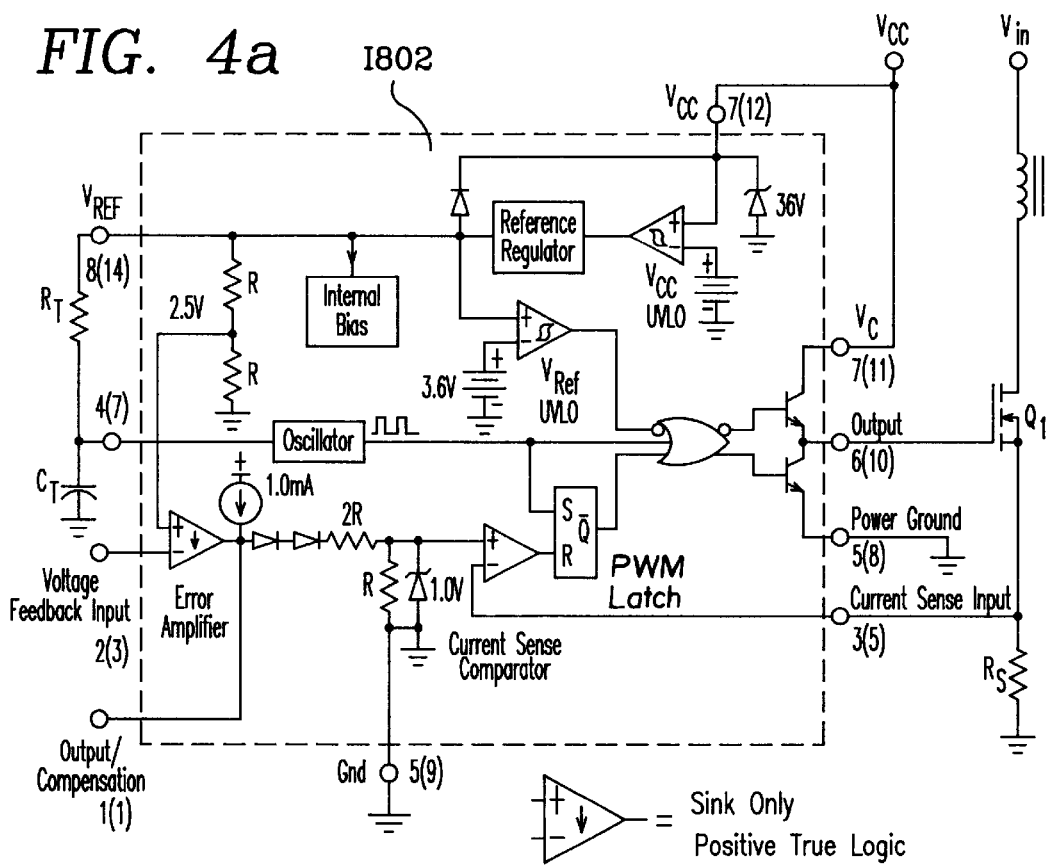
FIG. 4a shows the circuit structure of the integrated circuit UC3842A used in a switchmode power supply.
Figure 4B:
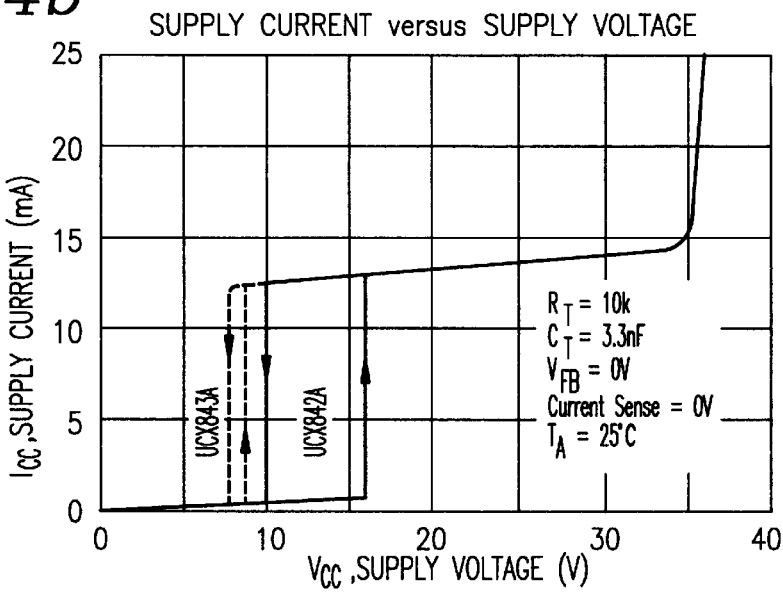
FIG. 4b shows a Vcc-Icc characteristic diagram of the integrated circuit UC3842A.

(3) Start-Lip Circuit: The capacitor $C_{815}$ is charged through a resistor $R_{811}$ by a current. When the voltage of the capacitor $C_{815}$ has increased to 16V, the capacitor $C_{815}$ is connected with the seventh pin of the integrated circuit $I_{802}$ so that the integrated circuit $I_{802}$ will be activated. Then the pulsed modulated signal (PWM) will be sent out from the sixth pin. The activating current of the integrated circuit $I_{802}$ is smaller than 1 mA, and the working current is smaller than 17 mA, referring to FIG. 4b. It is appreciated that after the integrated circuit $I_{802}$ has been activated, when the working current is larger than the charging current of the resistor $R_{811}$, if the current of the diode $D_{810}$ does not feedback, then when the terminal current of the capacitor $C_{815}$ has reduced to below 10V, the integrated circuit $I_{802}$ will be idle.

(4) Driving Circuit: When the pulse sent out from the sixth pin of integrated circuit $I_{802}$ has transferred to a transistor $Q_{805}$ through the resistor $R_{815}$, if the pulse is in high voltage, the transistor $Q_{805}$ will conduct, and vice versa. When transistor $Q_{805}$ is conducted, the current will return to capacitor $C_{809}$ through path $\rightarrow T_{801} \rightarrow Q_{805} \rightarrow R_{831}$, and the primary inductor L of the transformer $T_{801}$ will store the energy induced from ½·Li² in the coils of the windings. After the transistor $Q_{805}$ has been cut off, then the magnetic energy is converted into electric energy which will be released from the secondary terminal of the transformer so that each set of the power sources can generate voltage.

(5) Voltage Feedback: The voltage generated by the feedback secondary winding of the transformer $T_{801}$ is used to charge the capacitor $C_{815}$ through rectifying of a diode $D_{812}$, filtering of a capacitor $C_{816}$ and a diode $D_{815}$ (the detail may refer to the description of the activating circuit), so that the voltage of the capacitor $C_{815}$ may stay with the range of 10V~35V (set to be 12V) for operating the integrated circuit $I_{802}$. Then it is connected to the voltage divider of the resistor $R_{825}$ and resistor $R_{826}$ for connecting to the second pin of the integrated circuit $I_{802}$. When the dividing voltage is larger than 2.5V, the sixth pin of the integrated circuit $I_{802}$ will stop outputting voltage immediately. Thereby, the output voltages of all the power supply outputs are controlled to the predetermined value.

(6) Protection of Current Limitation: When the transistor $Q_{805}$ is activating, in order to avoid an over-current phenomenon, a resistor $R_{831}$ is connected in series with the source so that the voltage decrement of the $I_S \times R_{831}$ is smaller than 1V. Otherwise, the overload of the third pin of the integrated circuit $I_{802}$ will force the integrated circuit $I_{802}$ to stop. The current $I_S$ is the source current of the transistor $Q_{805}$.

(7) Frequency Control: When the integrated circuit $I_{802}$ is working, the eighth pin will generate a reference voltage 5V used by the resistor $R_{817}$ and capacitor $C_{820}$ oscillating circuit. The oscillating frequency is determined by the resistor $R_{817}$ and the capacitor $C_{820}$. If the resistor $R_{817}$=4.3K and the capacitor $C_{820}$=0.022 $\mu$F, from the specification of the integrated circuit $I_{802}$, it is known that the frequency is approximately equal to 20 KHz.

(8) Error Compensation: There is an amplifier in the integrated circuit $I_{802}$. The gain of the amplifier is controlled by a resistor $R_{823}$, while the reaction is controlled by a capacitor $C_{818}$. Since the feedback value of the voltage in the second pin of the integrated circuit $I_{802}$ is equal to 2.5V±Δυ' Δυ=error value, the value of Δυ is directly proportional to the voltage error of each set of power supply outputs. In other words, if the voltage value is larger, then the error of the output voltage for each set of power supplies of the transformer $T_{801}$ is large, and if the error is smaller, then the working voltage of the integrated circuit $I_{802}$ will become short so that the power loss of the transistor $Q_{805}$ is large and the temperature will increase. The error of the output voltage is negatively proportional to the value of the resistor $R_{823}$, but is positively proportional to the value of the capacitor $C_{818}$.

(9) Elimination of Inducing Voltage: Since the transformer $T_{801}$ is an inductive load, when the transistor $Q_{805}$ is cut off from conduction, the primary terminal of the transformer $T_{801}$ will generate a reverse electromotive force which is formed by L×di/dt, wherein L is the inductance of primary terminal of transformer $T_{801}$, i is the induction current of transistor $Q_{805}$; and t is the fall time for cutting off the transistor $Q_{805}$. This inducing voltage has a value of several volts and, thus it exceeds the breakdown voltage of $Q_{805}$ so that the transistor will be destroyed. Therefore, a snubber circuit is needed for absorbing the energy from the electromotive force formed by L×di/dt, so that the voltage will decrease to a value within the range which may be endured by the transistor. The capacitor $C_{814}$ resistor $R_{833}$ and diode $D_{807}$ form one eliminating circuit, and another elimination circuit is formed by the capacitor $C_{813}$ resistor $R_{813}$ and diode $D_{806}$.

Figure 5B:
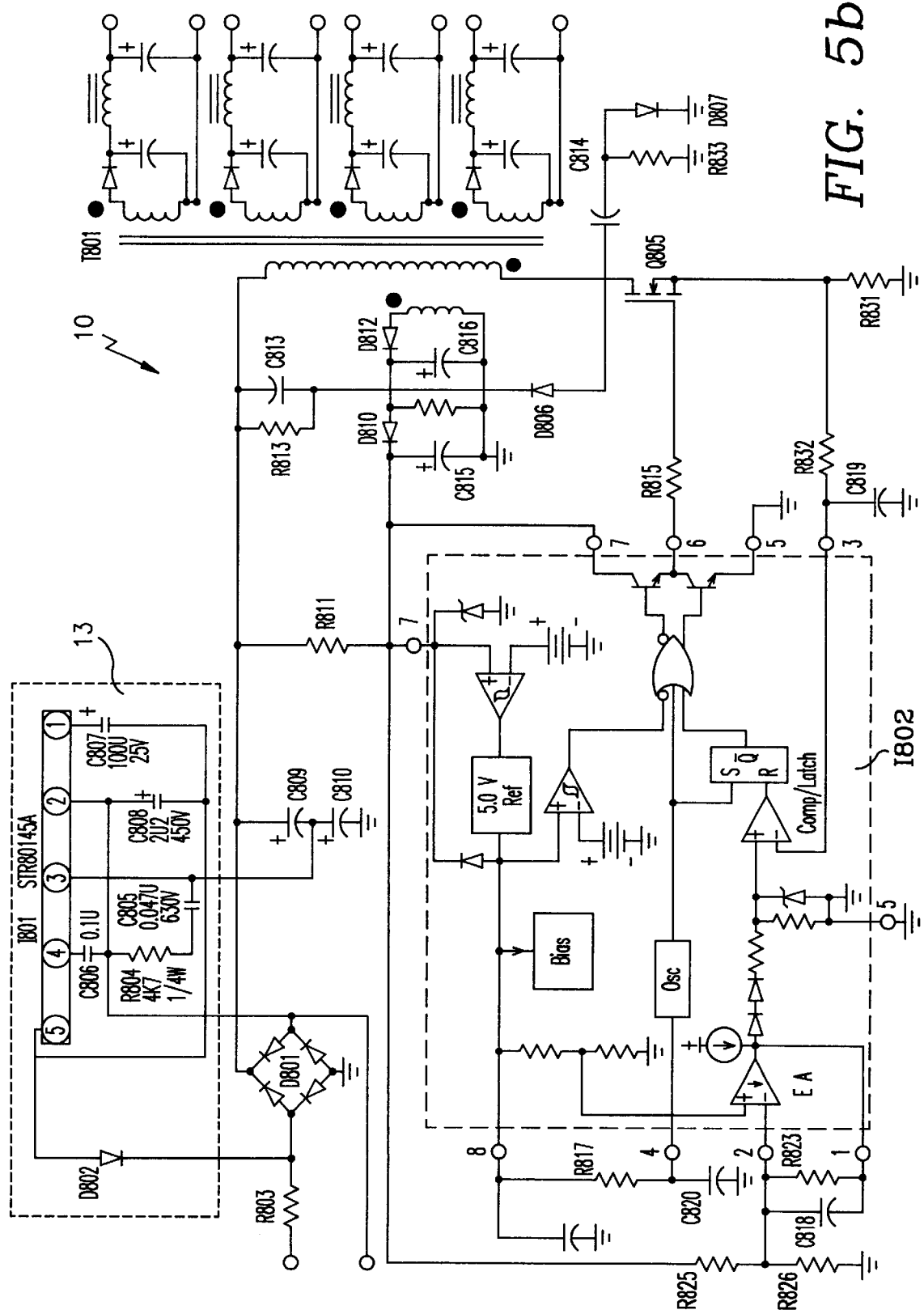
FIG. 5b shows a circuit diagram of the auto range control of a switchmode power supply.

(10) Voltage Doubler: Referring to FIG. 5a, (circuit diagram of the switchmode power supply in a full range mode) and FIG. 5b (circuit diagram of the switchmode power supply in an auto range mode), a voltage doubler circuit 13 is further added, which is formed by a voltage multiplying, rectifying and switching device (integrated circuit ) $I_{801}$ and a voltage biasing circuit. If the voltage of the power supply is between 88V~132V, then the detecting circuit within the voltage multiplying, rectifying and switching device $I_{801}$ will activate and cause the Triac to conduct so that the second pin and third pin of the voltage multiplying, rectifying and switching device $I_{801}$ is shorted to become a connecting line for voltage multiplying and rectifying. If the voltage of the power supply is between 176V~264V, then the detecting circuit within the voltage multiplying, rectifying and switching device $I_{801}$ will cut off and cause the Triac to stop so that the second pin and third pin of the voltage multiplying, rectifying and switching device $I_{801}$ are opened and only have the function of full wave rectifying.

Figure 6:
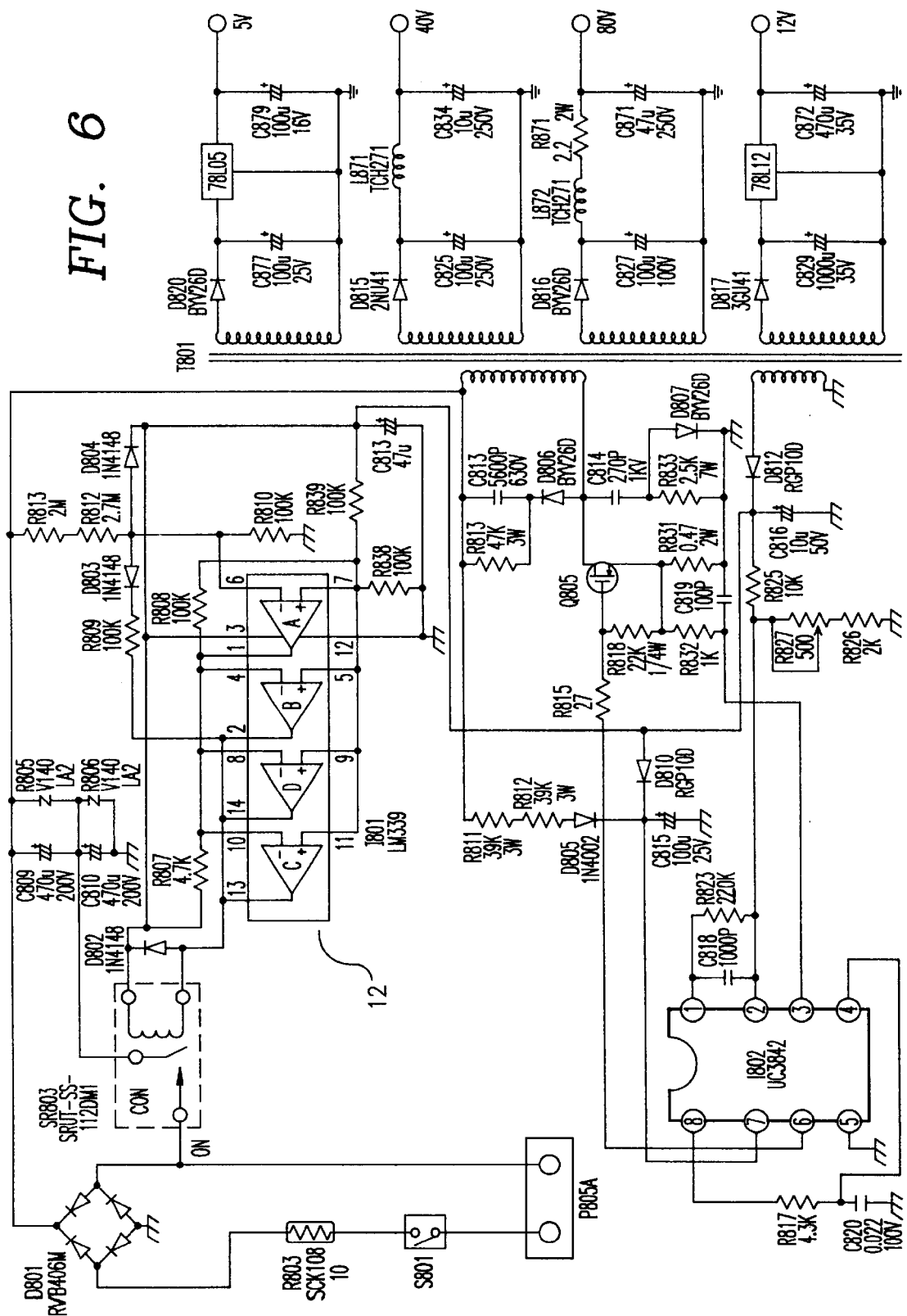
FIG. 6 shows the circuit diagram of the present invention.

The characteristic of the present invention is that the voltages of power sources are compared, then the results are outputted to drive a relay $SR_{803}$. By the opening or closing of the contacts of the relay $SR_{803}$, the rectifying circuit 13 may be controlled to output a voltage of one time or two times. Referring now to FIG. 6, the following will describe the voltage multiplying and rectifying circuit 13.

In this embodiment, the type of integrated circuit used is LM339 in which four comparators A, B, C, and D are built. The comparators B, C, and D are connected in parallel with connecting lines for increasing the number of output ports and sink current so as to drive the relay $SR_{803}$ to activate. Thus, the comparators B, C, and D are considered as one unit (in the following call as "comparator BCD"). Also, the voltage of the first pin of the integrated circuit $I_{801}$ is defined as $V_1$, and the voltage of the second pin of the integrated circuit $I_{801}$ is defined as $V_2$, and so on.

(a) The initial condition of the input voltage of power source:

The power is input from P805A. When the power source switch $S_{801}$ is closed, then the current will flow through a rectifier $D_{801}$ to resistor $R_{811}$ and resistor $R_{812}$ to charge the capacitor $C_{815}$. When the terminal voltage of the capacitor $C_{815}$ is 16V, the integrated circuit $I_{802}$ will be activated. Then, the feedback voltage of the secondary terminal of the transformer $T_{801}$ will charge the capacitor $C_{816}$ through a diode $D_{812}$. Assuming the terminal voltage of the capacitor $C_{816}$ is 2.5V. In fact, during initially charging the capacitor $C_{815}$, there is voltage existed on the sixth pin of the integrated circuit $I_{801}$ but the third pin (Vcc) still has no voltage. In order to avoid the voltage in the input port larger than that in the power source port to destroy the component, therefore, a diode $D_{804}$ is further added to Vcc for clamping in order to protect the component. Therefore, in the initial condition of the comparator A, since $V_6 > V_7$, thus $V_1 = 0V$. When the capacitor $C_{816}$ is charged to a full voltage—12.5V ' since $V_4 = V_1 = 0V$, $V_5 = V_7$ and $V_7 > 0V$ ' the output voltage of the comparator BCD is 12.5V. Thereby the relay $SR_{803}$ will not operate.

(b) The input of the voltage of power source has remained in a steady condition:

The resistor $R_{808}$ is the forward feedback resistor of comparator A for forming a hysteresis comparing effect. Since in the initial condition, $V_1 = 0V$, the resistor $R_{808}$ and resistor $R_{838}$ will be forced to connect in parallel (represent by $R_{808}//R_{838}$). That is:

$$V_7 = 12.5V \times \frac{R_{808} // R_{838}}{R_{808} // R_{838} + R_{839}}$$

It is know from FIG. 6:

$R_{808} = R_{838} = R_{839} = 100K$, so that $V_7 = 4.17V$.

$$V_6 = \sqrt{2} \times V_{AC} \times \frac{R_{810}}{R_{810} + R_{812} + R_{813}}$$

As shown in FIG. 6; it is known that $R_{810} = 100K$ ' $R_{812} = 2.7M$ ' $R_{813} = 2M$ ' if (I). $V_{AC} = 100V$ level ' then $V_6 = 3.24 \pm 0.65V = 3.89V \sim 2.49V$ so that $V_6 < V_7$, and $V_1 = 12.5V$. Thereby, resistor $R_{808}$ is serially connected with resistor $R_{807}$ to Vcc, and similarly connected with $R_{839}$ in parallel. The voltage $V_7$ is increased to 8.34V so to form a delaying function (referring to the description in (c)). Meanwhile, in comparator BCD, $V_4 = V_1 = 12.5V$ ' while $V_5 = V_7 = 8.34V$, $V_4 > V_5$, causing that $V_2 = 0V$, i.e., the relay $SR_{803}$ is conducted. Before the contacts of the relay $SR_{803}$ have been closed, since when $V_2 = 0V$, the resistor $R_{809}$ will be enforce to short, so that the resistor $R_{809}$ and the resistor $R_{810}$ are virtually in parallel for reducing one half of the voltage $V_6$ in order to avoid that after the contacts of the relay $SR_{803}$ are closed, the voltage multiplying and rectifying are formed so that the voltage of $V_6$ is increased to two times, and thus the contacts will open and close alternatively. Thus in design, it is needed that after the relay has been conducted, the voltage $V_6$ is still unchanged, that is:

$$V_6 = \sqrt{2} \times V_{AC} \times \frac{R_{809} // R_{810}}{R_{809} // R_{810} + R_{812} + R_{813}}$$

since $V_{AC} = 110V$ level, resistor $R_{809} = 100K$, and thus $V_6 = 3.89V \sim 2.49V$ ' to still remain $V_6 < V$, so that the relay $SR_{803}$ will conduct continuously.

(II). $V_{AC} = 220V$ level, then $V_6 = 6.48 \pm 1.30V = 7.78V \sim 5.18V$, so that $V_6 > V_7$ and $V_1$ remain unchanged, i.e. $V_1 = 0V$. Since $V_4 = V_1 = 0V$, while $V_5$ $V_7 = 4.17V$, thus $V_4 < V_5$. The output of comparator BCD is 12.5V, and thus the relay $SR_{803}$ will not operate.

(C) The input of the voltage of power source is unstable:

When the voltage of power source is divided as 110V and 220V, then if the power source is abnormal due to power system fault, the voltage of power source is probably between 132V~176V, and therefore:

(I). When the voltage of power source increases to 132V from 88V (but not attain 176V), two times voltage rectifying and control are used.

(II). When the voltage of power source decreases to 176V from 264V (but not return to 132V), one time voltage rectifying and control are used.

The overlapping region between 132V and 176V could be controlled by the delay characteristic of this comparator. That is, if the resistance of the resistor $R_{808}$ is large, then the voltage range of the overlapping region is also large, and vice versa. In addition, since the resistor $R_{809}$ is affected by diode $D_{803}$, only one side of delay characteristic is affected, i. e., it is affected only to the extent that the voltage is increased from 132V. According to the measuring results shown in FIG. 6, when the voltage is increased from 88V to 194V, the system is in the state of two times rectifying control, while when the voltage is decreased from 264V to 148V, the system is in the state of one time rectifying control.

Figure 1A:
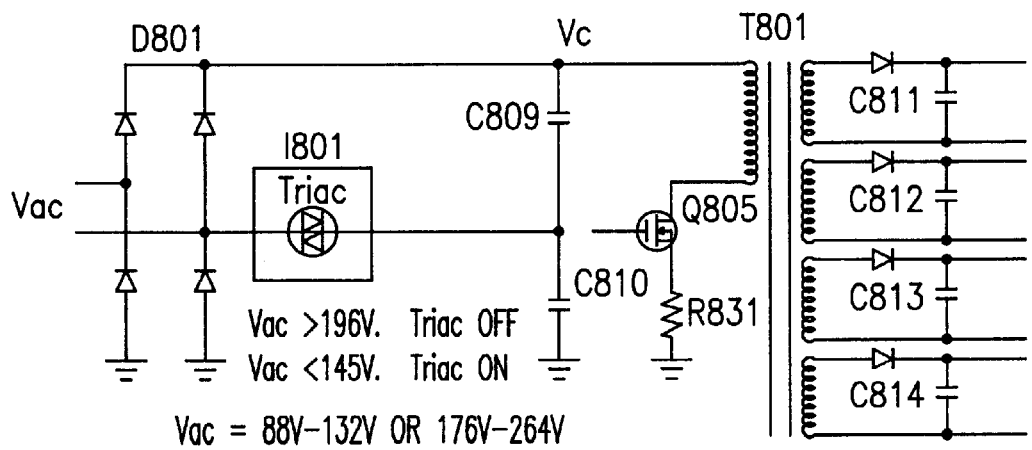
FIG. 1a shows a rectifier circuit of a prior art monitor the power source of which is controlled by an auto range mode.
Figure 1B:
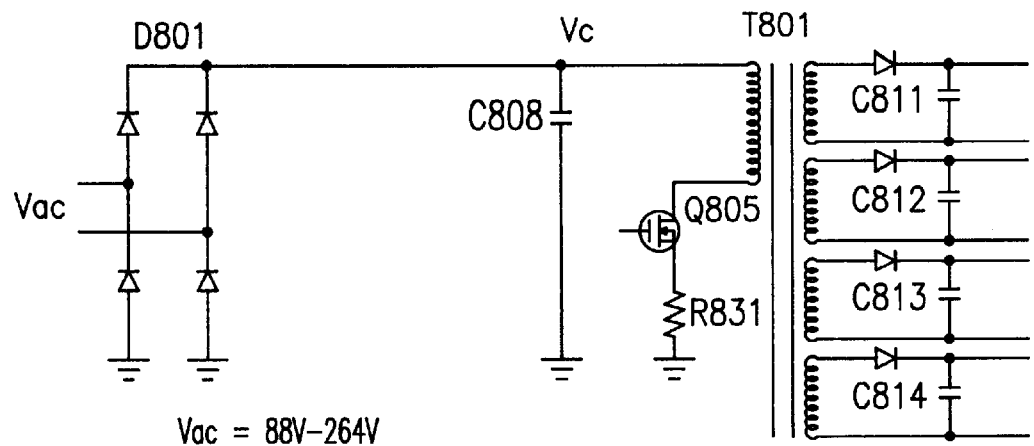
FIG. 1b shows a rectifier circuit of a prior art monitor the power source of which is controlled by a full range mode.
Figure 2A:
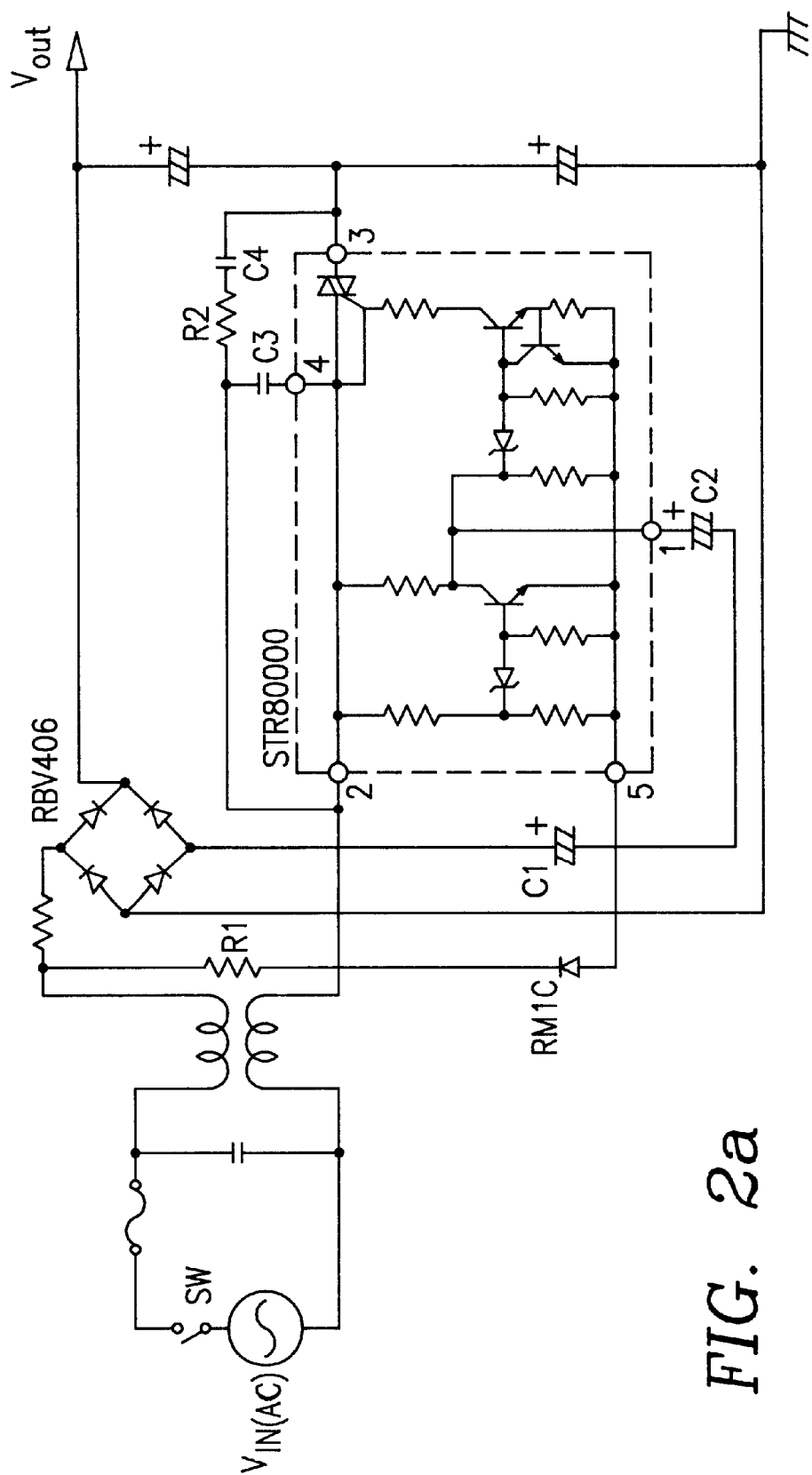
FIG. 2a shows the circuit structure of the integrated circuit of a voltage doubler.
Figure 2B:
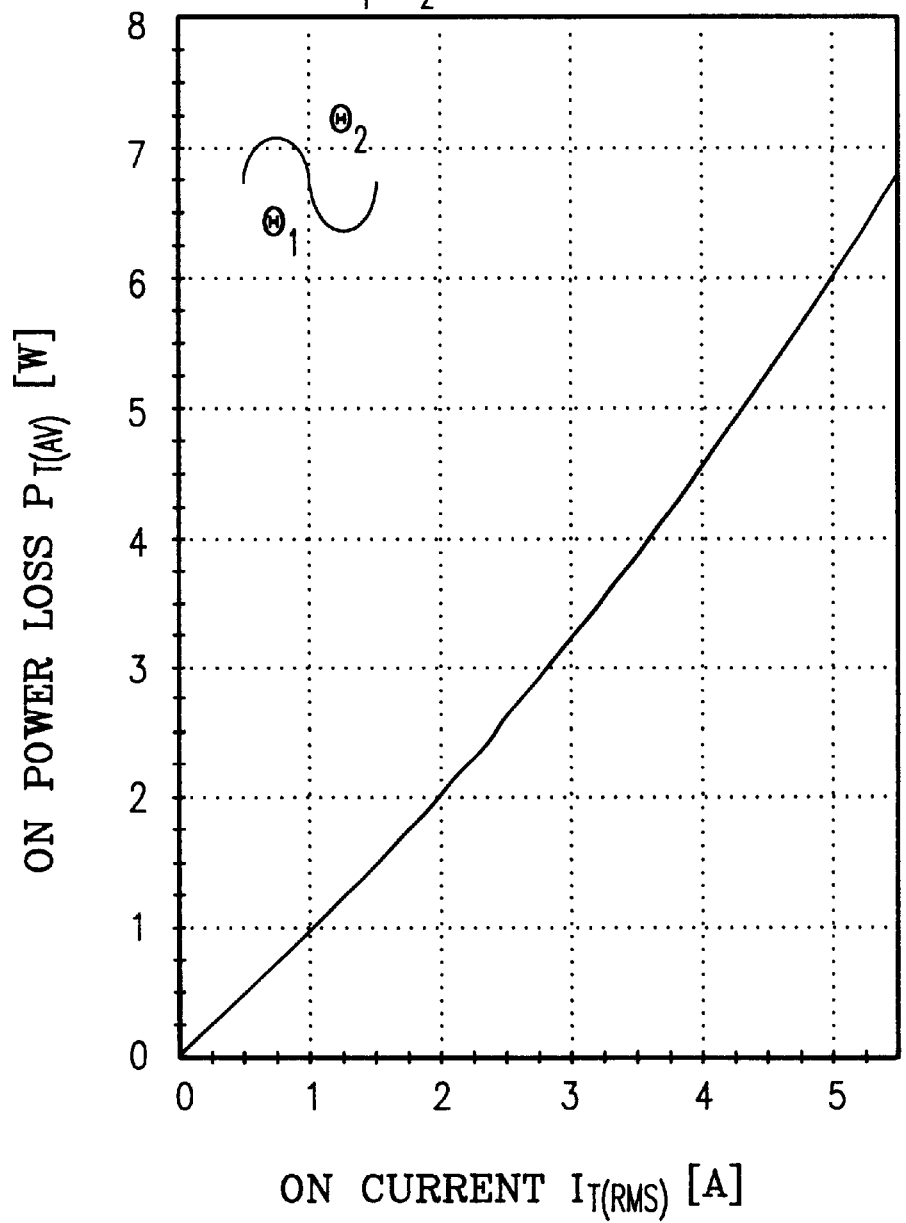
FIG. 2b shows the $P_T$-$I_T$ characteristic diagram as the integrated circuit STR80145A is conducted.

The contact resistance of the contacts of the relay $SR_{803}$ is very small, generally smaller than 0.1 Ω. For, example, for the TATUNG in the Table 3, in AC110V, the current consumption is between 1.503A~1.028A, and thus power consumption $I^2R$ is equal to 0.226 W~0.106 W. For the same current, the power consumption in the prior art circuit driving portion (Triac) is larger than 1.5 W~1.0 W (referring to FIG. 2b). Moreover, when the input is AC110 level, the relay $SR_{803}$ will operate (specification of coil: DC12V, 400 Ω). The power consumption of the voltage biasing portion thereof is $12^2/400 = 0.36V$, while the power consumption of the voltage biasing portion in the prior-art circuit is 0.84 W~2.73 W (testing values). The following table (Table 5) lists the power consumption in the two conditions:

TABLE 5

| | | Input of power source | | | |
|---|---|---|---|---|---|
| | | AC110 V level | | AC220 V level | |
| control circuit | | 88 V | 132 V | 176 V | 264 V |
| Prior art (STR80145A) | Biasing portion | 0.84 W | 1.62 W | 1.13 W | 2.73 W |
| | Driving portion | >1.5 W | >1.0 W | 0 W | 0 W |
| Present embodiment (LM339 + Relay) | Biasing portion | 0.36 W | 0.36 W | 0 W | 0 W |
| | Driving portion | <0.226W | <0.106W | 0 W | 0 W |
| Power saved (results) | | >1.754W | >2.154W | 1.13 W | 2.73 W |

In summary, it is to be appreciated that from the measuring value of Table 4 or from the analyzing value of Table 5, that the automatic switching device for the power source input range of the present invention saves more power than that in the prior art circuit.

What is claimed is:

1. A device for automatically switching a power source input range of a monitor used with a personal computer, said device being installed in a switchmode power source circuit of the monitor, comprising:

a bridge rectifier for rectifying an alternating current power source into a direct current power source for supplying power to internal circuits of the monitor;

two serial capacitors having positive ends connected with positive ends of said bridge rectifier, and negative ends connected with negative ends of said bridge rectifier, so as to filter output pulses produced by bridge rectifier, thereby reducing ripple current;

a relay for controlling said bridge rectifier to output one times or two times a voltage of the direct current power source, said relay having two contacts, one being electrically connected with a connection point of said serial capacitors, and the other being electrically connected with a power source line so that when the power source line has a power input of AC 110V, said two contacts conduct and said bridge rectifier outputs two times the voltage of the direct current power source; and a comparator arranged to detect the voltage level of said direct current power source, the output of said comparator being arranged to drive said relay so as to turn on or turn off said contacts of said relay;

wherein when the alternating current power source input is at a 100V level, said device for automatically switching the power source input range is arranged to be automatically switched to control said bridge rectifier to output one times the voltage of the direct current power source; while when the alternating current power source input is at a 220V level, said device for automatically switching the power source input range is arranged to be automatically switched to control said bridge rectifier to output two times the voltage of the direct current power source.

2. The device for automatically switching a power source input range of a monitor used with a personal computer as described in claim 1, further comprising a voltage biasing circuit, the power source of said voltage biasing circuit being supplied from the secondary winding of a power supply.

* * * * *